(12) United States Patent
Mulmuley et al.

(10) Patent No.: US 12,580,908 B2
(45) Date of Patent: Mar. 17, 2026

(54) SYSTEM AND METHOD FOR AUTHENTICATING AND AUTHORIZING CLOUD ACCOUNTS TO ACCESS ON-PREMISES SERVICES

(71) Applicant: Microsoft Technology Licensing, LLC, Redmond, WA (US)

(72) Inventors: Atharva Mulmuley, Hyderabad (IN); Krupesh Satishkumar Dhruva, Hyderabad (IN); Chandra Mouli Addaguduru, Bangalore (IN); Monis Masood Khan, Garner, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 18/478,386

(22) Filed: Sep. 29, 2023

(65) Prior Publication Data

US 2025/0112912 A1 Apr. 3, 2025

(51) Int. Cl.
H04L 9/40 (2022.01)
G06F 9/54 (2006.01)

(52) U.S. Cl.
CPC ............ H04L 63/083 (2013.01); G06F 9/547 (2013.01); H04L 63/0281 (2013.01); H04L 63/10 (2013.01)

(58) Field of Classification Search
None
See application file for complete search history.

(56) References Cited

U.S. PATENT DOCUMENTS

| | | | | |
|---|---|---|---|---|
| 11,153,279 B2 * | 10/2021 | Murray | ............... | H04L 41/0806 |
| 11,595,488 B2 * | 2/2023 | Deo | ......................... | H04L 67/53 |
| 12,309,158 B2 * | 5/2025 | Anderson | ............. | H04L 63/068 |
| 12,321,725 B1 * | 6/2025 | Wilson | ...................... | G06F 8/36 |
| 12,360,822 B2 * | 7/2025 | Mehrotra | ............. | G06F 9/4856 |
| 12,425,428 B1 * | 9/2025 | Sobrier | ................. | H04L 67/535 |
| 2005/0154886 A1 * | 7/2005 | Birk | .................... | H04L 63/0815 |
| | | | | 713/168 |
| 2006/0225132 A1 * | 10/2006 | Swift | ...................... | G06F 21/33 |
| | | | | 726/11 |
| 2010/0071052 A1 * | 3/2010 | Mao | ....................... | H04L 67/565 |
| | | | | 726/12 |
| 2017/0026902 A1 * | 1/2017 | Roskind | .................. | H04L 67/34 |

(Continued)

FOREIGN PATENT DOCUMENTS

| | | |
|---|---|---|
| CN | 112822061 A | 5/2021 |
| CN | 118153689 A | 6/2024 |

OTHER PUBLICATIONS

International Search Report and Written Opinion received for PCT Application No. PCT/US2024/045909, Dec. 3, 2024, 13 pages.

*Primary Examiner* — Lashonda Jacobs-Burton

(57) ABSTRACT

A method, computer program product, and computing system for processing a request from a cloud-computing environment to access an on-premises Kubernetes application programming interface (API) server. A user associated with the request is identified. A user-specific service account for accessing the on-premises Kubernetes API server is generated. A protocol type associated with the request is determined. A user-specific reverse proxy for the user-specific service account is generated based upon, at least in part, the protocol type associated with the request. The request is forwarded to the on-premises Kubernetes API server using the user-specific reverse proxy.

20 Claims, 6 Drawing Sheets

(56)            References Cited

U.S. PATENT DOCUMENTS

2018/0307472 A1* 10/2018 Paul ...................... H04L 41/082
2021/0243164 A1* 8/2021 Murray ............... H04L 41/0806
2022/0300386 A1* 9/2022 Auch ...................... H04L 67/56
2023/0104568 A1* 4/2023 Miriyala ................. H04L 45/42
                                        718/104
2023/0216851 A1* 7/2023 Totale ................ H04L 63/0815
                                        726/5
2024/0129377 A1* 4/2024 Deo ........................ H04L 67/53

* cited by examiner

10

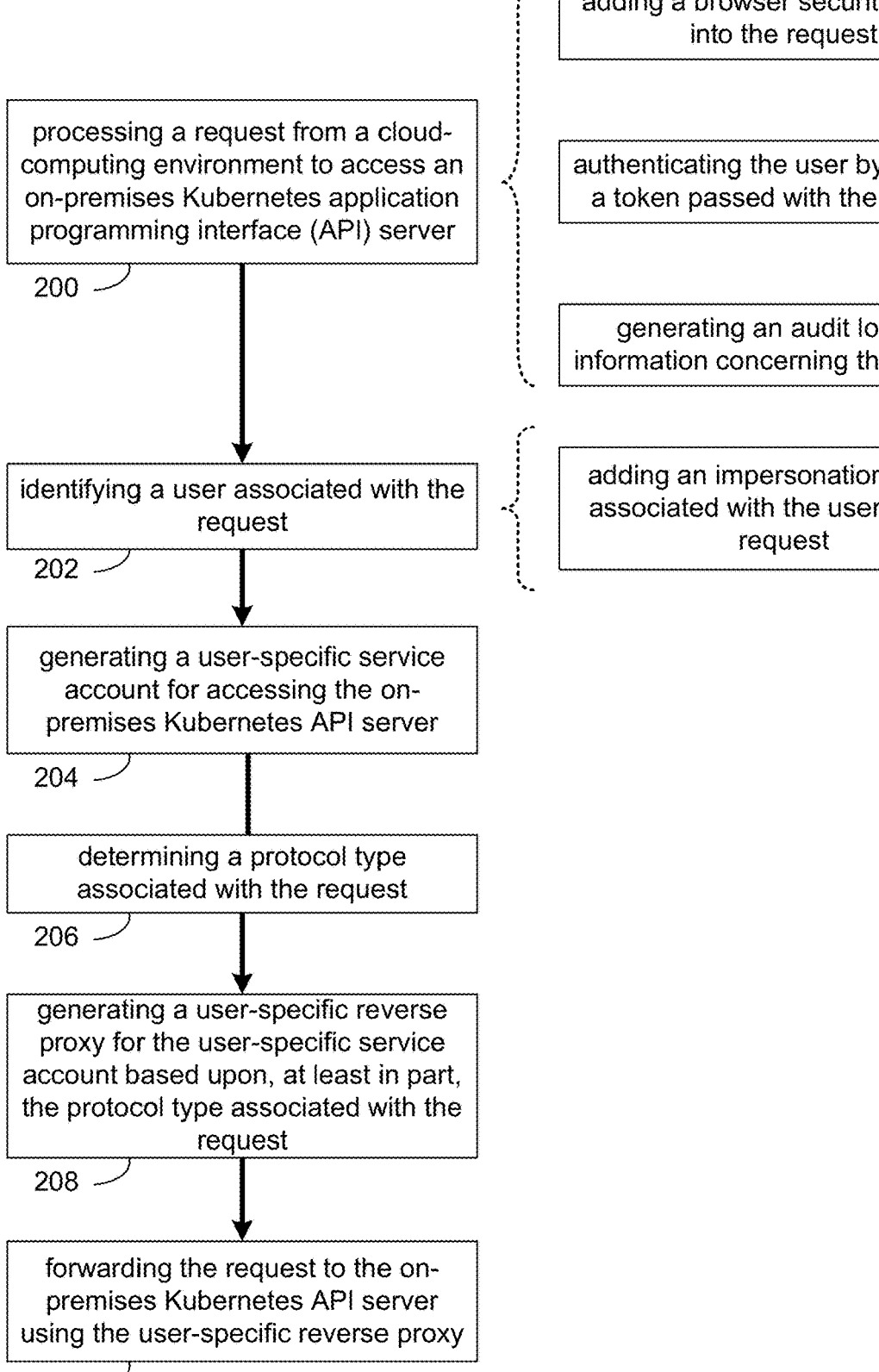

adding a browser security header into the request

212 processing a request from a cloud-computing environment to access an on-premises Kubernetes application programming interface (API) server

200 authenticating the user by verifying a token passed with the request

214 generating an audit log with information concerning the request

218 identifying a user associated with the request

202 adding an impersonation header associated with the user into the request

216 generating a user-specific service account for accessing the on-premises Kubernetes API server

204 determining a protocol type associated with the request

206 generating a user-specific reverse proxy for the user-specific service account based upon, at least in part, the protocol type associated with the request

208 forwarding the request to the on-premises Kubernetes API server using the user-specific reverse proxy

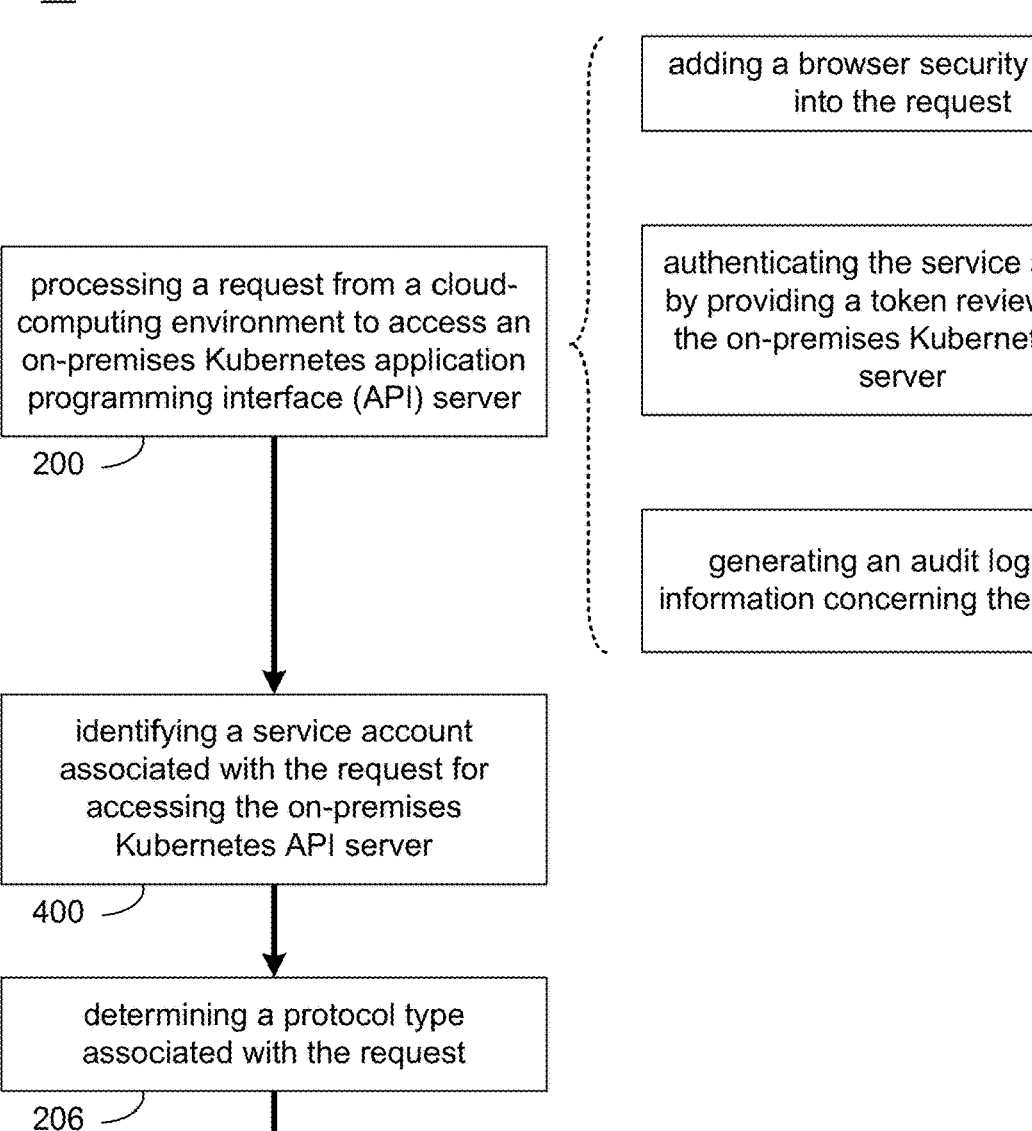

adding a browser security header into the request

406 processing a request from a cloud-computing environment to access an on-premises Kubernetes application programming interface (API) server

200 authenticating the service account by providing a token review call to the on-premises Kubernetes API server

408 generating an audit log with information concerning the request

410 identifying a service account associated with the request for accessing the on-premises Kubernetes API server

400 determining a protocol type associated with the request

206 generating a reverse proxy for the service account based upon, at least in part, the protocol type associated with the request

402 forwarding the request to the on-premises Kubernetes API server using the reverse proxy

SYSTEM AND METHOD FOR AUTHENTICATING AND AUTHORIZING CLOUD ACCOUNTS TO ACCESS ON-PREMISES SERVICES

BACKGROUND

On-premises service(s) typically do not have visibility to cloud user accounts. However, these services are generally unable to authenticate and authorize cloud users in a secure manner. As such, vulnerabilities exist where a malicious user can execute a request in the context of a service account that is used to impersonate a cloud user account. For example, connection headers in certain protocols may be leveraged to perform unauthorized impersonations or proxies of secure accounts, exposing on-premises services.

BRIEF DESCRIPTION OF THE DRAWINGS

FIG. 2 is a flow chart of one implementation of a on-premises reverse proxy access process;

FIG. 4 is a flow chart of one implementation of a on-premises reverse proxy access process;

Like reference symbols in the various drawings indicate like elements.

DETAILED DESCRIPTION

Figure 1:
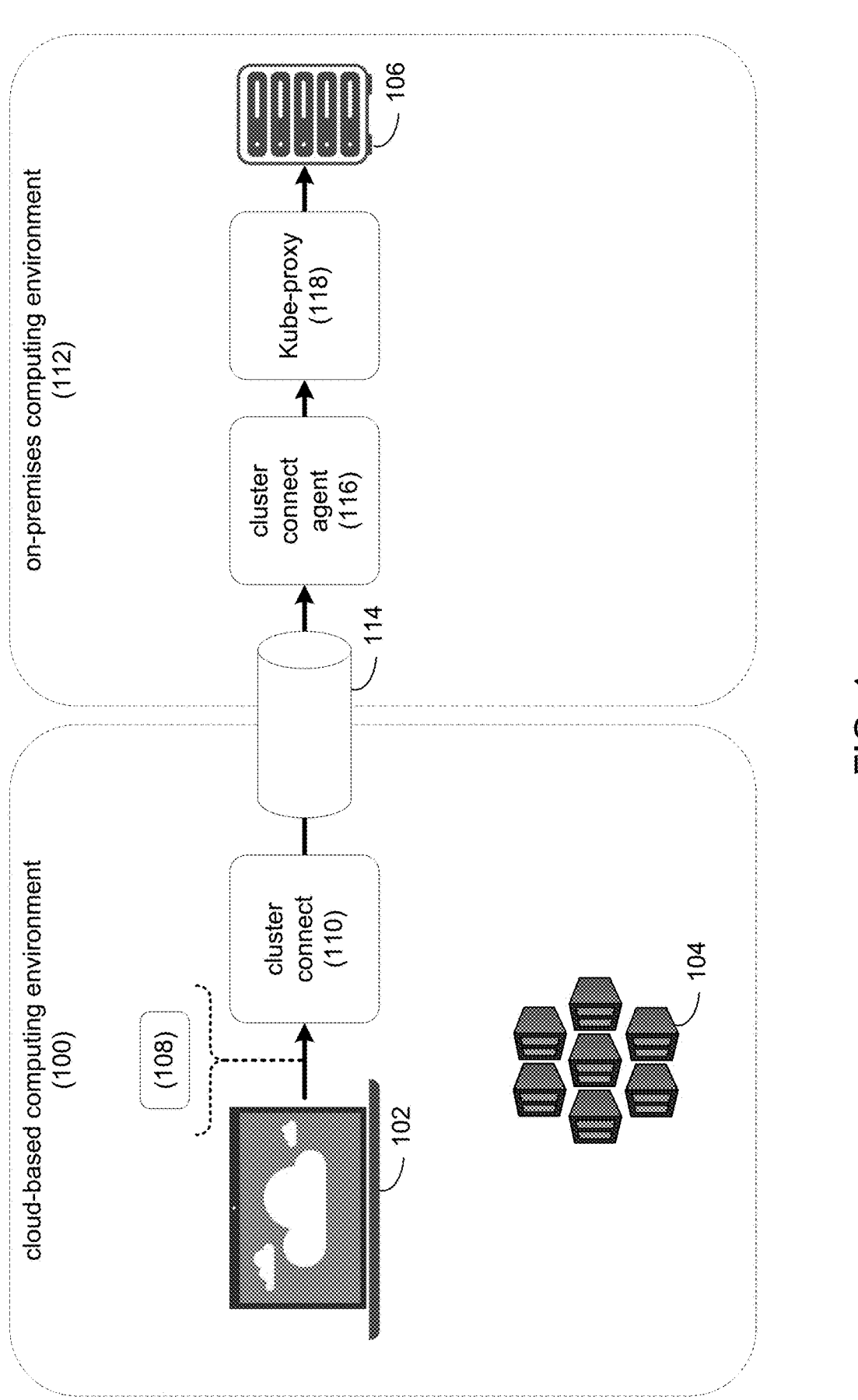
FIG. 1 is a diagrammatic view of the interaction between a cloud-based user and an on-premises Kubernetes application programming interface (API) server.

Implementations of the present disclosure provide an architecture for secure authentication and authorization of cloud account users to access on-premises services and resources. For example, many service providers and businesses use servers to perform various tasks or to provide services. The deployment and management of server resources on-premises (i.e., on a service provider's or business's own infrastructure) is difficult. As such, various virtualized resources have been introduced to reduce the complexity and to increase the utilization of these on-premises resources. In one example, Kubernetes clusters provide a more lightweight and flexible option than virtual machines. For example, a Kubernetes cluster is a set of nodes that run containerized applications (i.e., an application with its dependences and some necessary services). Kubernetes clusters allow containers to run across multiple machines and environments: virtual, physical, cloud-based, and on-premises. Kubernetes containers are not restricted to a specific operating system, unlike virtual machines. Instead, they are able to share operating systems and run anywhere. A Kubernetes cluster generally includes six main components:

An application programming interface (API) server that exposes a REST interface to all Kubernetes resources and serves as the front end of the Kubernetes control plane.

A scheduler that places containers according to resource requirements and metrics. The scheduler makes note of deployable computing units with no assigned node and selects nodes for them to run on.

A controller manager runs controller processes and reconciles the cluster's actual state with its desired specifications. The controller manager manages controllers such as node controllers, endpoints controllers, and replication controllers.

A Kubelet ensures that containers are running in a deployable computing unit by interacting with the Docker engine (i.e., the default program for creating and managing containers) and takes a set of provided specifications and ensures that their corresponding containers are fully operational.

A Kube-proxy manages network connectivity and maintains network rules across nodes. The Kube-proxy implements the Kubernetes Service concept across every node in a given cluster.

An Etcd stores all cluster data as a consistent and highly available Kubernetes backing store.

Deploying a Kubernetes cluster using on-premises computing resources may be subject to limited capacity (i.e., number of deployable computing units, bandwidth of on-premises computing resources, etc.). As such, cloud-based Kubernetes clusters may be used to extend the number of and performance of Kubernetes clusters for a particular service. For example and referring also to FIG. 1, a cloud-based computing environment (e.g., cloud-based computing environment 100) may include a cloud-based user (e.g., cloud-based user 102) that can provide a cloud-based Kubernetes cluster (e.g., cloud-based Kubernetes cluster 104). However, as cloud-based Kubernetes cluster 104 is generic to any application, cloud-based Kubernetes cluster 104 accesses on-premises Kubernetes cluster resources within an on-premises Kubernetes application programming interface (API) server (e.g., on-premises Kubernetes API server 106). This connection is made possible by processing a Kubernetes API server call (e.g., Kubernetes API server call 108) from cloud-based user 102 that is processed by a cluster connect (e.g., cluster connect 110) that is a hosted proxy service and transmitted from cloud-based computing environment 100 to an on-premises computing environment or server (e.g., on-premises computing environment 112) using a hybrid connection (e.g., hybrid connection 114). Within on-premises computing environment 112, a cluster connect agent (e.g., cluster connect agent 116) may forward Kubernetes API server call 108 to a Kube-proxy (e.g., Kube-proxy 118) that authenticates and authorizes Kubernetes API server call 108 for communication with Kubernetes API server 106.

This linking of cloud-based user 102 and accounts that manage cloud-based Kubernetes cluster 104 with on-premises Kubernetes API server 106 can lead to security vulnerabilities between cloud-based computing environment 100 and on-premises computing environment 112. For example, generic service accounts within on-premises Kubernetes API server 106 can impermissibly impersonate a cloud-based user or cloud-based account resulting in unauthorized access to on-premises Kubernetes resources within on-premises Kubernetes API server 106.

Implementations of the present disclosure allow for more secure authorization and authentication of cloud-based requests to access an on-premises Kubernetes API server by separating transports or channels between the Kube-proxy and the on-premises Kubernetes API server based on protocol types associated with the request and by separating channels between the Kube-proxy and the on-premises Kubernetes API server based on the cloud-based user. In this manner, a Kubernetes service account forwarding the request will only have permissions to impersonate the user for which it is forwarding the request. Accordingly, separate service accounts for each user are maintained, with each service account just having the permission to impersonate the user to which it corresponds to.

As will be described in greater detail below, implementations of the present disclosure process requests to access the on-premises Kubernetes API server by identifying a user associated with the request and generating a user-specific service account for accessing the on-premises Kubernetes API server. In some implementations, the user-specific service account is limited to the identified user. A protocol type associated with the request is determined such that a user-specific reverse proxy is generated for the user-specific service account for the protocol type associated with the request. In some implementations, this allows requests from particular users to generate a reverse proxy that is limited to impersonating the user from the request and is limited to the protocol type of the request. For example, this limits vulnerabilities where unauthorized users use generic service accounts to perform impermissible accessing of the on-premises Kubernetes API server. With the reverse proxy limited to the particular user's service account and the protocol type from the request, the request is securely forwarded to the on-premises Kubernetes API server.

This ensures that even if a malicious user is somehow able to execute the request in the context of a service account responsible for forwarding the request, the request would eventually fail as the service account would only have permissions to impersonate the malicious user, which does not translate into any permissions on the cluster as the malicious user had no permissions to begin with.

The details of one or more implementations are set forth in the accompanying drawings and the description below. Other features and advantages will become apparent from the description, the drawings, and the claims.

The On-Premises Reverse Proxy Access Process:

Referring to FIGS. 1-6, on-premises reverse proxy access process 10 processes 200 a request from a cloud-computing environment to access an on-premises Kubernetes application programming interface (API) server. A user associated with the request is identified 202. A user-specific service account for accessing the on-premises Kubernetes API server is generated 204. A protocol type associated with the request is determined 206. A user-specific reverse proxy for the user-specific service account is generated 208 based upon, at least in part, the protocol type associated with the request. The request is forwarded 210 to the on-premises Kubernetes API server using the user-specific reverse proxy.

In some implementations, on-premises reverse proxy access process 10 processes 200 a request from a cloud-computing environment to access an on-premises Kubernetes application programming interface (API) server. As discussed above and in some implementations, on-premises reverse proxy access process 10 provides an architecture for secure authentication and authorization of cloud account users to access on-premises services and resources. For example and as shown in FIG. 1, a request (e.g., request 300) may be a Kubernetes API server call (e.g., Kubernetes API server call 108) from a cloud-based user 102 using a cloud account to access on-premises Kubernetes resources. In some implementations, the request (e.g., request 300) may be a Kubernetes API server call (e.g., Kubernetes API server call 108) from a service account to manage on-premises Kubernetes resources. Regardless of whether the request is from a cloud-based user using a cloud account or using a service account, each request may be transferred from cloud-based computing environment 100 to on-premises computing environment 112 using a cluster connect (e.g., cluster connect 110). Within on-premises computing environment 112, a cluster connect agent (e.g., cluster connect agent 116) may forward Kubernetes API server call 108 to a Kube-proxy (e.g., Kube-proxy 118) that authenticates and authorizes Kubernetes API server call 108 for communication with on-premises Kubernetes API server 106.

As discussed above and in one example, the request is associated with a cloud-based user (e.g., cloud-based user 102) seeking to manage cloud-based Kubernetes cluster (e.g., cloud-based Kubernetes cluster 104) by accessing an on-premises Kubernetes API server (on-premises Kubernetes API server 106). In another example, the request is associated with a service account seeking to manage cloud-based Kubernetes cluster 104 by accessing on-premises Kubernetes API server 106. As on-premises reverse proxy access process 10 may include different actions depending on the request (i.e., cloud-based user using a cloud account or a service account), each implementation will be discussed in greater detail below.

Cloud-Based User Account Access Request

Figure 3:
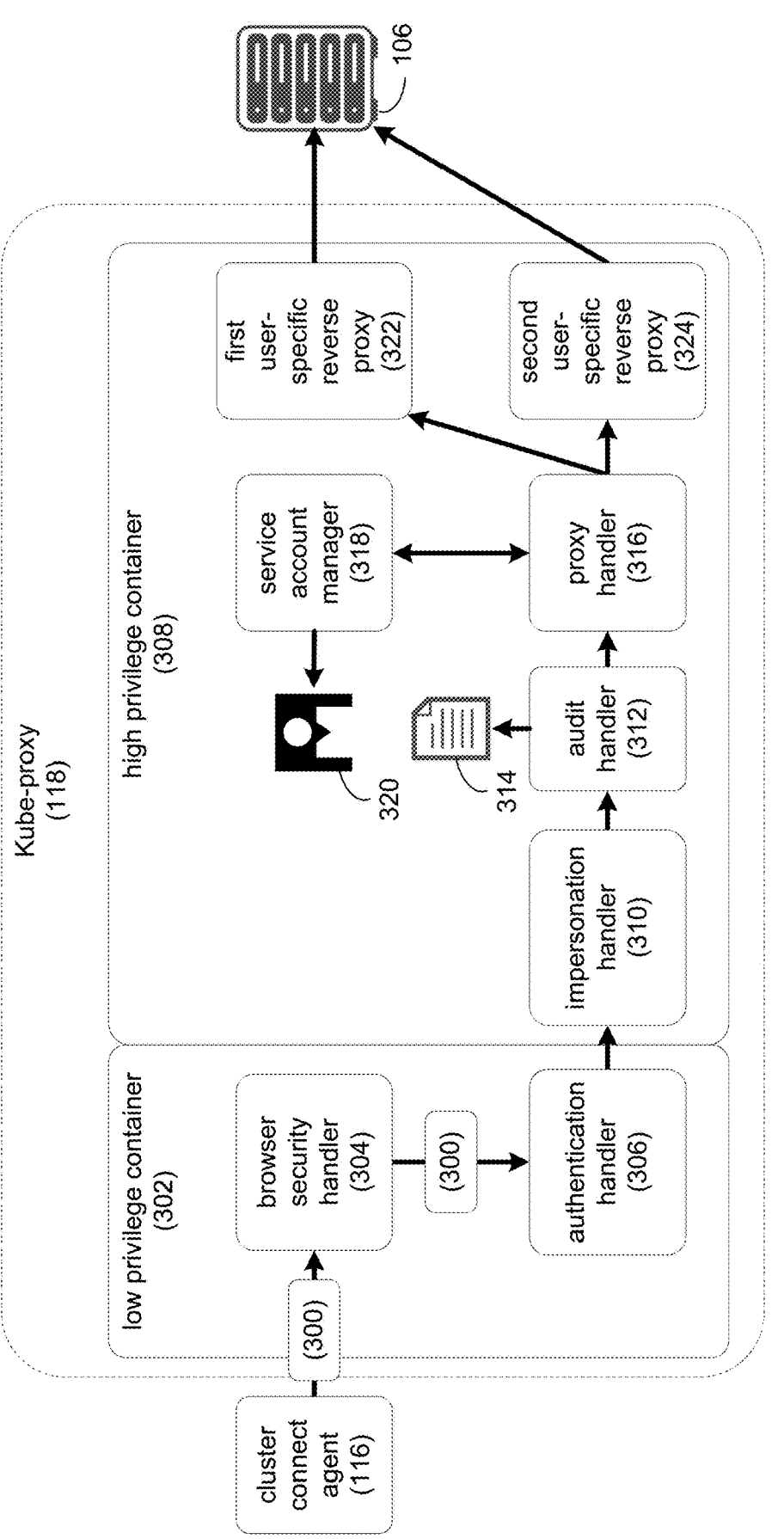
FIG. 3 is a diagrammatic view of the authentication and authorization of requests from a cloud-based user and an on-premises Kubernetes API server.

In some implementations, processing 200 the request from a cloud-computing environment includes adding 212 a browser security header into the request. Referring also to FIG. 3, cluster connect agent 116 provides request 300 to a low-privilege container (e.g., low privilege container 302). A low privilege container is a subset of the features of Kube-proxy 118 that works with a service account and has limited token review privileges (i.e., privileges required for service account authentication). In one example, low privilege container runs a hypertext transfer protocol (HTTP) server using a public certificate of on-premises Kubernetes API server 106. In this example, low privilege container 302 includes a browser security header handler (e.g., browser security header handler 304) and an authentication handler (e.g., authentication handler 306). Browser security header handler 304 is a hardware and/or software component that adds 212 a header in the request (e.g., request 300) to improve security and control browser behavior. For example, the following security headers may be added 212 by on-premises reverse proxy access process 10:

A content-security-policy header that prevents cross-site scripting attacks, clickjacking attacks, and other code injection attacks.

An x-frame-options header that prevents clickjacking attacks.

An x-xss-protection header that prevents cross-site scripting attacks by sanitizing user input.

An x-content-type-options header that prevents a browser from "guessing" the content type of the resource, which can help prevent some attacks.

A referrer-policy header that controls the amount of information about the referring page sent in a HTTP header. This prevents some types of privacy related attacks.

An x-DNS-prefetch-control header that controls whether a browser should perform DNS prefetching which can improve performance.

A cache-control header that controls how a browser caches resources which can improve performance.

An expiration header that controls caching behavior by setting expiration time for a cached resource.

While the above listing provides various examples of security headers that are added to request 300, it will be appreciated that various other security headers are possible within the scope of the present disclosure. As shown in FIG. 3, with the browser security headers added, on-premises reverse proxy access process 10 provides request 300 to authentication handler 306 for authentication.

In some implementations, processing 200 the request from a cloud-computing environment includes authenticating 214 the user by verifying a token passed with the request. For example and as shown in FIG. 3, on-premises reverse proxy access process 10 provides request 300 from browser security header handler 304 to authentication handler 306 for authentication. Authentication handler 306 is a hardware and/or software component that verifies a predefined token passed with request 300. For example, the token may be a "proof of possession" or "PoP" token. A PoP token is bound to the user/machine that wants to access a protected resource, via a public/private key pair and is bound to the protected resource itself (i.e., a token that is used to access). In some implementations, on-premises reverse proxy access process 10 requires accessing clients (e.g., cloud-based user 102) to generate PoP tokens with each request (e.g., request 300). As such, by authenticating a PoP token for a particular user, on-premises reverse proxy access process 10 authenticates 214 the user. As shown in FIG. 3, with the request authenticated, on-premises reverse proxy access process 10 provides request 300 to an impersonation handler.

In some implementations, once authenticated, on-premises reverse proxy access process 10 passes request 300 from low privilege container 302 to a high privilege container (e.g., high privilege container 308). A high privilege container provides more sensitive information and configurations concerning on-premises Kubernetes API server 106. For example, high privilege container 308 provides impersonation privileges, privileges to create service accounts, and privileges to assign role bindings to created service accounts.

In some implementations, on-premises reverse proxy access process 10 identifies 202 a user associated with the request. For example, suppose request 300 is generated by cloud-based user 102 to manage the deployment of a cloud-based Kubernetes cluster (e.g., cloud-based Kubernetes cluster 104) by accessing an on-premises Kubernetes API server (on-premises Kubernetes API server 106). In this example, suppose cloud-based user 102 is an authorized user of on-premises Kubernetes API server 106. Accordingly and as will be described in greater detail below, on-premises reverse proxy access process 10 can limit access to on-premises Kubernetes API server 106 based on identifying 202 a user associated with request 300 (e.g., cloud-based user 102).

In some implementations, identifying 202 the user associated with the request includes adding 216 an impersonation header associated with the user into the request. For example and as shown in FIG. 3, on-premises reverse proxy access process 10 provides request 300 from authentication handler 306 to an impersonation handler (e.g., impersonation handler 310). Impersonation handler 310 is a hardware and/or software component that adds headers concerning "impersonation" of a user into the request (e.g., request 300). For example, on-premises reverse proxy access process 10 identifies 202 user information from request 300 (e.g., a tag or metadata indicating the user of request 300). In this example, on-premises reverse proxy access process 10 adds 216 impersonation headers that describe the need to "impersonate" cloud-based user's identity in order to access on-premises Kubernetes API server 106. Now suppose that cloud-based user 102 is not an authorized user of on-premises Kubernetes API server 106. In this example, on-premises reverse proxy access process 10 adds impersonation header information for cloud-based user 102 regardless and, as will be discussed in greater detail below, on-premises reverse proxy access process 10 uses this information to prevent cloud-based user 102 from accessing on-premises Kubernetes API server 106 by generating a reverse proxy that is cloud-based user 102-specific and, therefore, rendering cloud-based user 102 unable to access on-premises Kubernetes API server 106.

In some implementations, processing 200 the request from a cloud-computing environment includes generating 218 an audit log with information concerning the request. For example and as shown in FIG. 3, on-premises reverse proxy access process 10 provides request 300 from impersonation handler 310 to an audit handler (e.g., audit handler 312). Audit handler 312 is a hardware and/or software component that generates Kubernetes audit logs. For example, in response to processing 200 the request (e.g., request 300) using audit handler 312, on-premises reverse proxy access process 10 generates a Kubernetes audit log (e.g., audit log 314) for the user request before forwarding it to on-premises Kubernetes API server 106. In one example, on-premises reverse proxy access process 10 logs request metadata such as user, request, impersonated user, date of request, time of request, etc. in audit log 314. In some implementations, by generating 218 audit log 314, more information about each request made to on-premises Kubernetes API server 106 via Kube-proxy 118 is recorded. Additionally, the user information from the audit log is available for being compared with the user information obtained from token review call made during service account authentication. In this manner, on-premises reverse proxy access process 10 provides enhanced user authentication in the form of the combination of the PoP token review and the user information provided in the audit log.

In some implementations, on-premises reverse proxy access process 10 generates 204 a user-specific service account for accessing the on-premises Kubernetes API server. For example and referring again to FIG. 3, on-premises reverse proxy access process 10 provides request 300 from audit handler 312 to a proxy handler (e.g., proxy handler 316). A proxy handler is a hardware and/or software component that generates a reverse proxy from a service account based on the type of the request and the user. For example, proxy handler 316 processes request 300 to identify the user associated with the request. Proxy handler 316 interacts with a service account manager (e.g., service account manager 318) to generate a new user-specific service account or to access an existing user-specific service account. For example, suppose cloud-based user 102 seeks to access on-premises Kubernetes API server 106 by providing request 300. Proxy handler 316 interacts with service account manager 318 to generate 204 a user-specific service account (e.g., user-specific service account 320). In this example, service account manager 318 returns user-specific service account 320 to proxy handler 316.

In some implementations, on-premises reverse proxy access process 10 determines 206 a protocol type associated with the request. For example and in some implementations, the protocol type is one of a hypertext transport protocol (HTTP)/1.1 type and a HTTP/2 type. HTTP/1.1 is a top-level application protocol that exchanges information between a client computer and a local or remote web server. In this process, a client sends a text-based request to a server by calling a method like GET or POST. In response, the server sends a resource like an HTML page back to the client. HTTP/2 is a related protocol with certain distinct features. For example, one of the most significant features that distinguishes HTTP/1.1 and HTTP/2 is the binary framing layer, which can be thought of as a part of the application layer in the internet protocol stack. As opposed to HTTP/1.1, which keeps all requests and responses in plain text format, HTTP/2 uses the binary framing layer to encapsulate all messages in binary format, while still maintaining HTTP semantics, such as verbs, methods, and headers. An application-level API still creates messages in the conventional HTTP formats, but the underlying layer converts these messages into binary. This ensures that web applications created before HTTP/2 can continue functioning as normal when interacting with the new protocol. As each protocol type has different features, on-premises reverse proxy access process 10 generates a reverse proxy specific to each protocol type.

In some implementations, on-premises reverse proxy access process 10 generates 208 a user-specific reverse proxy for the user-specific service account based upon, at least in part, the protocol type associated with the request. A reverse proxy is hardware and/or software component that intercepts a request from a client to a server and acts as an intermediary between the client and the server. Reverse proxies, in some cases, secure the server from a client by first inspecting the request from the client for potential security threats before forwarding the request to the server. Using user-specific service account 320, on-premises reverse proxy access process 10 generates 208 a user-specific reverse proxy for user-specific service account 320 based upon, at least in part, the protocol type associated with the request. For example and in some implementations, a first user-specific reverse proxy (e.g., first user-specific reverse proxy 322) is generated for the user-specific service account for HTTP/1.1 protocol type requests and a second user-specific reverse proxy (e.g., second user-specific reverse proxy 324) is generated for the user-specific service account for HTTP/2 protocol type requests.

Suppose that on-premises reverse proxy access process 10 processes requests for two cloud-based users (e.g., user A and user B). In this example, on-premises reverse proxy access process 10 may generate four reverse proxies for these two requests: a reverse proxy made with HTTP/1.1 and user A (with permissions only to impersonate user A); a reverse proxy made with HTTP/2 and user A (with permissions only to impersonate user A); a reverse proxy made with HTTP/1.1 and user B (with permissions only to impersonate user B); and a reverse proxy made with HTTP/2 and user B (with permissions only to impersonate user B). In this manner, on-premises reverse proxy access process 10 secures on-premises Kubernetes API server 106 from unauthorized impersonations of user A by user B (or any other user) and unauthorized impersonations of user B by user A (or any other user).

In some implementations, on-premises reverse proxy access process 10 forwards 210 the request to the on-premises Kubernetes API server using the user-specific reverse proxy. For example, using either first user-specific reverse proxy 322 for cloud-based user 102 and HTTP/1.1, or second user-specific reverse proxy 324 for cloud-based user 102 and HTTP/2, on-premises reverse proxy access process 10 forwards the request to on-premises Kubernetes API server 106. At on-premises Kubernetes API server 106, the request (e.g., request 300) is processed. As discussed above, with the addition of security headers, impersonation headers, and the particular reverse proxy (e.g., first user-specific reverse proxy 322 or second user-specific reverse proxy 324), on-premises reverse proxy access process 10 is able to authorize, authenticate, and securely process requests from cloud-based users of cloud-based computing environments on an on-premises Kubernetes API server.

Service Account Access Request

Figure 5:
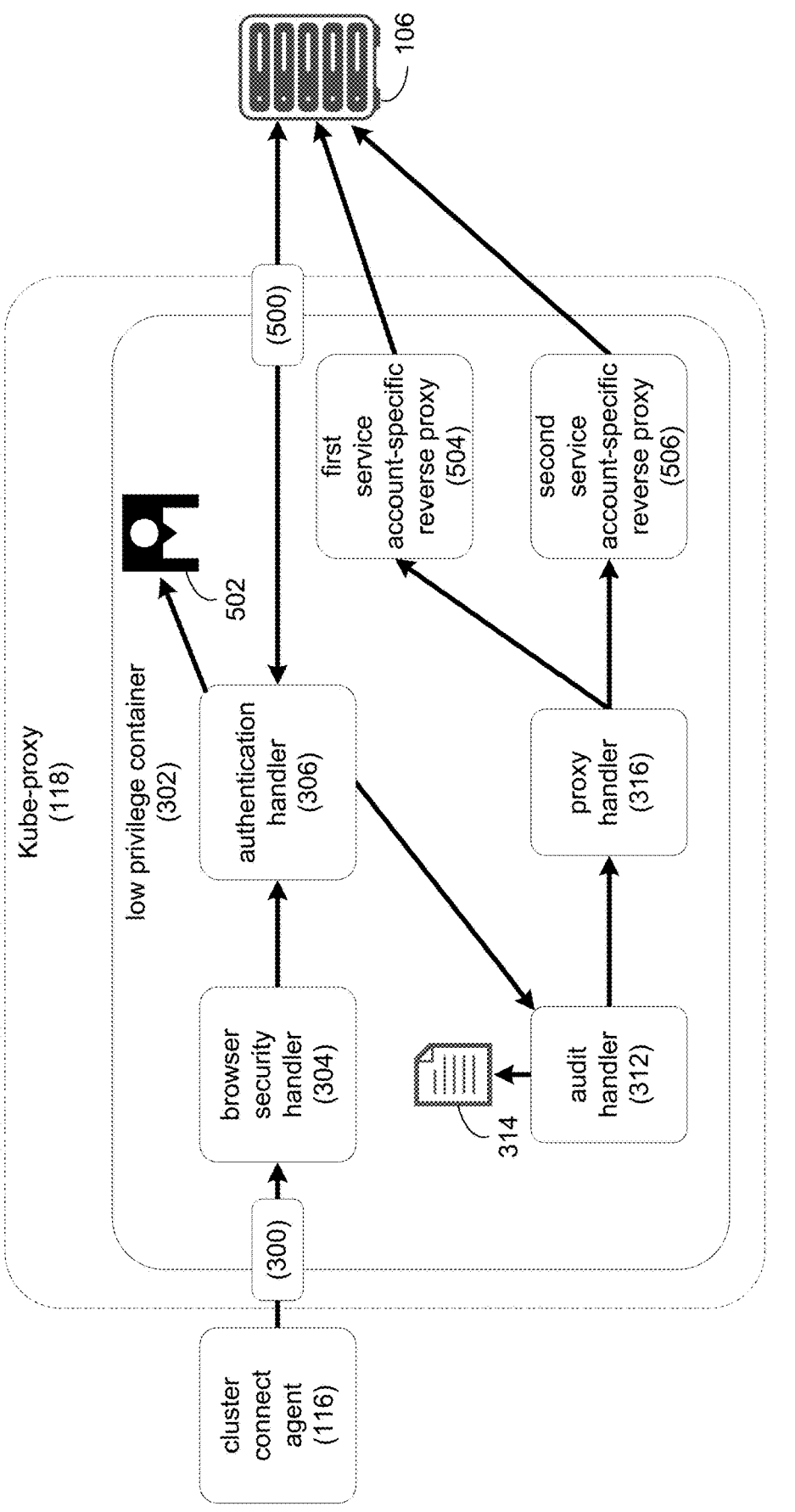
FIG. 5 is a diagrammatic view of the authentication and authorization of requests from a service account and an on-premises Kubernetes API server.
Figure 6:
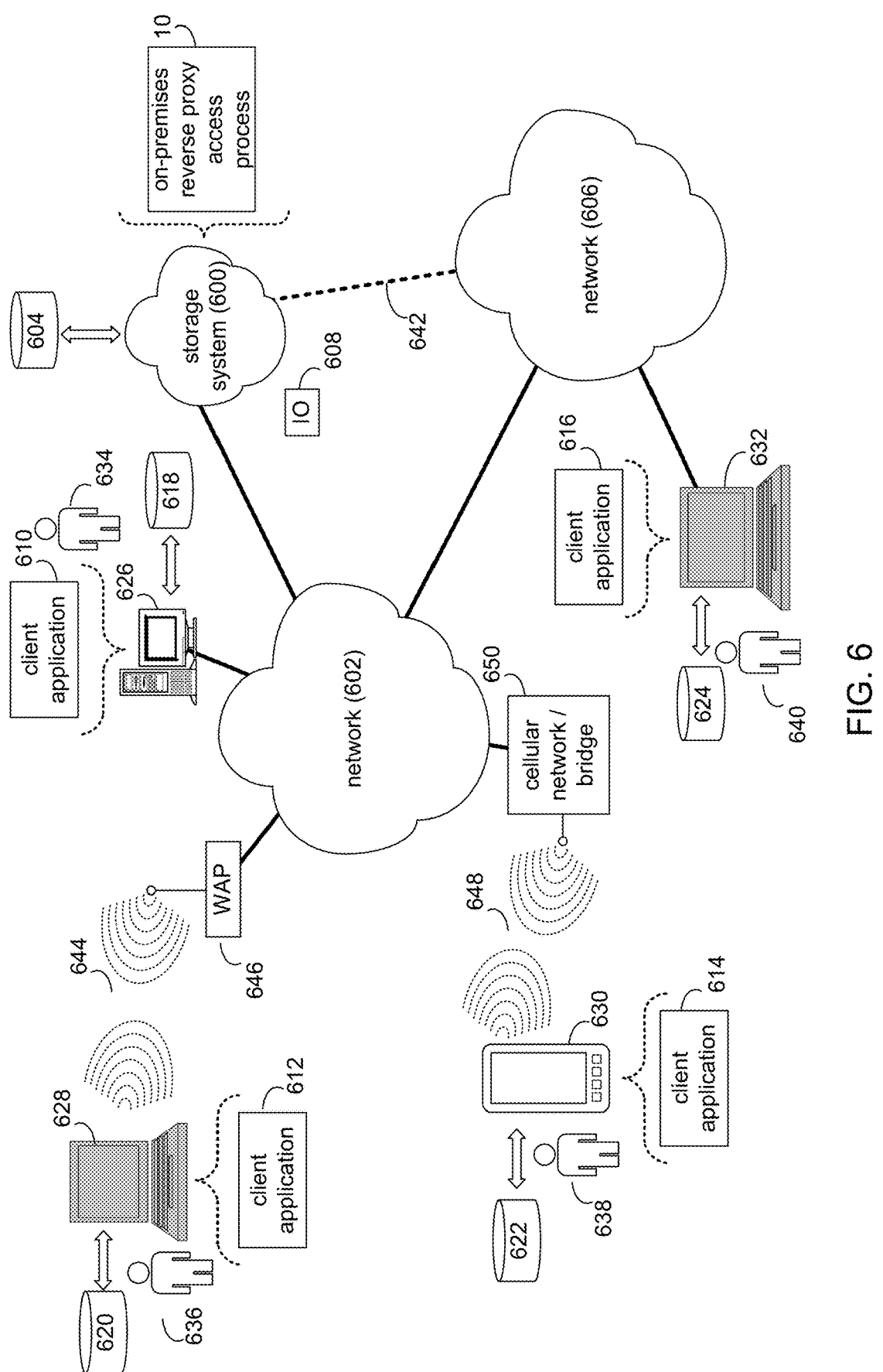
FIG. 6 is a diagrammatic view of computer system and a on-premises reverse proxy access process coupled to a distributed computing network.

Referring to FIGS. 4-6, on-premises reverse proxy access process 10 processes 200 a request from a cloud-computing environment to access an on-premises Kubernetes application programming interface (API) server. A service account associated with the request for accessing the on-premises Kubernetes API server is identified 400. A protocol type associated with the request is determined 206. A reverse proxy for the service account is generated 402 based upon, at least in part, the protocol type associated with the request. The request is forwarded 404 to the on-premises Kubernetes API server using the reverse proxy.

In some implementations, on-premises reverse proxy access process 10 identifies 400 a service account associated with the request for accessing the on-premises Kubernetes API server. As discussed above, a request (e.g., request 300) is processed 200 from a cloud-based user 102 using a cloud account to access on-premises Kubernetes resources. In this example, the request (e.g., request 300) is associated with a service account seeking to manage cloud-based Kubernetes cluster 104 by accessing on-premises Kubernetes API server 106. For example, suppose that a cloud-based user (e.g., cloud-based user 102) is using a service account to configure on-premises Kubernetes API server 106. In this example, on-premises reverse proxy access process 10 processes 200 the request (e.g., request 300) as shown in FIG. 5. In some implementations, on-premises reverse proxy access process 10 handles the authentication and authorization of request 300 using low privilege container 302.

In some implementations, processing 200 the request from a cloud-computing environment includes adding 406 a browser security header into the request. For example and as shown in FIG. 5, low privilege container 302 includes browser security header handler 304, authentication handler 306, audit handler 312, and proxy handler 316. As discussed above, browser security header handler 304 is a hardware and/or software component that adds 406 a header in the request (e.g., request 300) to improve security and control browser behavior. In some implementations, browser security header handler 304 adds 212 the same types of security headers as discussed above. As shown in FIG. 5, with the browser security headers added, on-premises reverse proxy access process 10 provides request 300 to authentication handler 306 for authentication.

In some implementations, processing 200 the request from a cloud-computing environment includes authenticating 408 the service account by providing a token review call to the Kubernetes API server. For example and as shown in FIG. 5, on-premises reverse proxy access process 10 provides request 300 from browser security header handler 304 to authentication handler 306 for authentication. As discussed above, authentication handler 306 is a hardware and/or software component that verifies a predefined token passed with request 300. In some implementations, each request includes a token associated with each service account that can be verified by providing a token review call (e.g., token review call 500) to on-premises Kubernetes API server 106. In one example, if token review call 500 indicates a valid service account for on-premises Kubernetes API server 106, authentication handler 306 receives confirmation of authentication (e.g., a predefined message sent by on-premises Kubernetes API server 106). In another example, if token review call 500 indicates an invalid service account for on-premises Kubernetes API server 106, authentication handler 306 receives denial of authentication (e.g., a predefined message sent by on-premises Kubernetes API server 106).

In some implementations, on-premises reverse proxy access process 10 authenticates 408 service account users in Kube proxy as opposed to authenticating at on-premises Kubernetes API server 106. As such, on-premises reverse proxy access process 10 does not forward request 300 to on-premises Kubernetes API server 106 if the authentication fails at Kube-proxy 118 at authentication handler 306. This additional check ensures that any exploitation which is based on leveraging high-privileged transports for calls to on-premises Kubernetes API server 106 while passing an invalid token in the request, will fail, since the request is rejected before it is forwarded to on-premises Kubernetes API server 106.

In some implementations, processing 200 the request from a cloud-computing environment includes generating 410 an audit log with information concerning the request. For example and as shown in FIG. 5, on-premises reverse proxy access process 10 provides request 300 from authentication handler 306 to audit handler 312. As discussed above, audit handler 312 is a hardware and/or software component that generates Kubernetes audit logs. For example, in response to processing 200 the request (e.g., request 300) using audit handler 312, on-premises reverse proxy access process 10 generates a Kubernetes audit log (e.g., audit log 314) for the user request before forwarding it to on-premises Kubernetes API server 106.

In some implementations, on-premises reverse proxy access process 10 determines 206 a protocol type associated with the request. For example and as discussed above, the protocol type is one of a hypertext transport protocol (HTTP)/1.1 type and a HTTP/2 type. In one example, suppose the request (e.g., request 300) is a HTTP/1.1 type request. In this example, on-premises reverse proxy access process 10 uses proxy handler 316 to generate 402 a reverse proxy for the service account (e.g., service account 502) that is specific to HTTP/1.1. In another example, suppose the request (e.g., request 300) is a HTTP/2 type request. In this example, on-premises reverse proxy access process 10 uses proxy handler 316 to generate 402 a reverse proxy for the service account (e.g., service account 502) that is specific to HTTP/2. In this manner, on-premises reverse proxy access process 10 accounts for various types of protocols.

In some implementations, on-premises reverse proxy access process 10 generates 402 a reverse proxy for the service account based upon, at least in part, the protocol type associated with the request. Using service account 502, on-premises reverse proxy access process 10 generates 402 a service account-specific reverse proxy for service account 502 based upon, at least in part, the protocol type associated with the request. For example and in some implementations, a first service account-specific reverse proxy (e.g., first service account-specific reverse proxy 504) is generated for the service account for HTTP/1.1 protocol type requests and a second service account-specific reverse proxy (e.g., second service account-specific reverse proxy 506) is generated for the service account for HTTP/2 protocol type requests. In this example, first service account-specific reverse proxy 504 is limited to forwarding requests associated with service account 502. Accordingly, other service accounts are unable to use first service account-specific reverse proxy 504.

In some implementations, on-premises reverse proxy access process 10 forwards 404 the request to the on-premises Kubernetes API server using the reverse proxy. For example, using either first service account-specific reverse proxy 504 for HTTP/1.1, or second service account-specific reverse proxy 506 for HTTP/2, on-premises reverse proxy access process 10 forwards the request to on-premises Kubernetes API server 106. At on-premises Kubernetes API server 106, the request (e.g., request 300) is processed. As discussed above, with the addition of security headers and the particular reverse proxy (e.g., first service account-specific reverse proxy 504 or second service account-specific reverse proxy 506), on-premises reverse proxy access process 10 is able to authorize, authenticate, and securely process requests from particular service accounts on an on-premises Kubernetes API server without exposing the on-premises Kubernetes API server to other service accounts or users.

System Overview:

Referring to FIG. 6, a on-premises reverse proxy access process 10 is shown to reside on and is executed by storage system 600, which is connected to network 602 (e.g., the Internet or a local area network). Examples of storage system 600 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of storage system 600 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of on-premises reverse proxy access process 10, which are stored on storage device 604 included within storage system 600, are executed by one or more processors (not shown) and one or more memory architectures (not shown) included within storage system 600. Storage device 604 may include: a hard disk drive; an optical drive; a RAID device; a random-access memory (RAM); a read-only memory (ROM); and all forms of flash memory storage devices. Additionally or alternatively, some portions of the instruction sets and subroutines of on-premises reverse proxy access process 10 are stored on storage devices (and/or executed by processors and memory architectures) that are external to storage system 600.

In some implementations, network 602 is connected to one or more secondary networks (e.g., network 606), examples of which include: a local area network; a wide area network; or an intranet.

Various input/output (IO) requests (e.g., IO request 608) are sent from client applications 610, 612, 614, 616 to storage system 600. Examples of IO request 608 include data write requests (e.g., a request that content be written to storage system 600) and data read requests (e.g., a request that content be read from storage system 600).

The instruction sets and subroutines of client applications 610, 612, 614, 616, which may be stored on storage devices 618, 620, 622, 624 (respectively) coupled to client electronic devices 626, 628, 630, 632 (respectively), may be executed by one or more processors (not shown) and one or more memory architectures (not shown) incorporated into client electronic devices 626, 628, 630, 632 (respectively). Storage devices 618, 620, 622, 624 may include: hard disk drives; tape drives; optical drives; RAID devices; random access memories (RAM); read-only memories (ROM), and all forms of flash memory storage devices. Examples of client electronic devices 626, 628, 630, 632 include personal computer 626, laptop computer 628, smartphone 630, laptop computer 632, a server (not shown), a data-enabled, and a dedicated network device (not shown). Client electronic devices 626, 628, 630, 632 each execute an operating system.

Users 634, 636, 638, 640 may access storage system 600 directly through network 602 or through secondary network 606. Further, storage system 600 may be connected to network 602 through secondary network 606, as illustrated with link line 642.

The various client electronic devices may be directly or indirectly coupled to network 602 (or network 606). For example, personal computer 626 is shown directly coupled to network 602 via a hardwired network connection. Further, laptop computer 632 is shown directly coupled to network 606 via a hardwired network connection. Laptop computer 628 is shown wirelessly coupled to network 602 via wireless communication channel 644 established between laptop computer 628 and wireless access point (e.g., WAP) 646, which is shown directly coupled to network 602. WAP 646 may be, for example, an IEEE 802.11a, 802.11b, 802.11g, 802.11n, Wi-Fi®, and/or Bluetooth® device that is capable of establishing a wireless communication channel 644 between laptop computer 628 and WAP 646. Smartphone 630 is shown wirelessly coupled to network 602 via wireless communication channel 648 established between smartphone 630 and cellular network/bridge 650, which is shown directly coupled to network 602.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

processing a request from a cloud-based computing environment to access an on-premises containerized cluster application programming interface (API) server;

identifying a user associated with the request;

generating a user-specific service account for accessing the on-premises containerized cluster API server;

determining a protocol type associated with the request;

generating a user-specific reverse proxy for the user-specific service account based upon, at least in part, the protocol type associated with the request; and forwarding the request to the on-premises containerized cluster API server using the user-specific reverse proxy.

2. The computer-implemented method of claim 1, wherein the protocol type is one of a hypertext transport protocol (HTTP)/1.1 type and a HTTP/2 type.

3. The computer-implemented method of claim 2, wherein a first user-specific reverse proxy is generated for the user-specific service account for HTTP/1.1 protocol type requests and a second user-specific reverse proxy is generated for the user-specific service account for HTTP/2 protocol type requests.

4. The computer-implemented method of claim 1, wherein processing the request from the cloud-based computing environment includes adding a browser security header into the request.

5. The computer-implemented method of claim 1, wherein processing the request from the cloud-based computing environment includes authenticating the user by verifying a token passed with the request.

6. The computer-implemented method of claim 1, wherein processing the request from the cloud-based computing environment includes generating an audit log with information concerning the request.

7. The computer-implemented method of claim 1, wherein identifying the user associated with the request includes adding an impersonation header associated with the user into the request.

8. A computing system comprising:

a memory; and a processor configured to process a request from a cloud-based computing environment to access an on-premises containerized cluster application programming interface (API) server, to identify a service account associated with the request for accessing the on-premises containerized cluster API server, to determine a protocol type associated with the request, to generate a reverse proxy for the service account based upon, at least in part, the protocol type associated with the request, and to forward the request to the on-premises containerized cluster API server using the reverse proxy.

9. The computing system of claim 8, wherein the protocol type is one of a hypertext transport protocol (HTTP)/1.1 type and a HTTP/2 type.

10. The computing system of claim 9, wherein a first user-specific reverse proxy is generated for the service account for HTTP/1.1 protocol type requests.

11. The computing system of claim 9, wherein a second user-specific reverse proxy is generated for the service account for HTTP/2 protocol type requests.

12. The computing system of claim 8, wherein processing the request from the cloud-based computing environment includes adding a browser security header into the request.

13. The computing system of claim 8, wherein processing the request from the cloud-based computing environment includes authenticating the service account by providing a token review call to the on-premises containerized cluster API server.

14. The computing system of claim 8, wherein processing the request from the cloud-based computing environment includes generating an audit log with information concerning the request.

15. A computer program product residing on a non-transitory computer readable medium having a plurality of instructions stored thereon which, when executed by a processor, cause the processor to perform operations comprising:

processing a request from a cloud-based computing environment to access an on-premises containerized cluster application programming interface (API) server;

identifying a user associated with the request;

generating an audit log with information concerning the request;

generating a user-specific service account for accessing the on-premises containerized cluster API server;

determining a protocol type associated with the request;

generating a user-specific reverse proxy for the user-specific service account based upon, at least in part, the protocol type associated with the request; and forwarding the request to the on-premises containerized cluster API server using the user-specific reverse proxy.

16. The computer program product of claim 15, wherein the protocol type is one of a hypertext transport protocol (HTTP) 1.1 type and a HTTP 2 type.

17. The computer program product of claim 16, wherein a first user-specific reverse proxy is generated for the user-specific service account for HTTP 1.1 protocol type requests and a second user-specific reverse proxy is generated for the user-specific service account for HTTP 2 protocol type requests.

18. The computer program product of claim 15, wherein processing the request from the cloud-based computing environment includes adding a browser security header into the request.

19. The computer program product of claim 15, wherein processing the request from the cloud-based computing environment includes authenticating the user by verifying a token passed with the request.

20. The computer program product of claim 15, wherein identifying the user associated with the request includes adding an impersonation header associated with the user into the request.

* * * * *